United States Patent [19]

Soodak et al.

[11] 4,056,708
[45] Nov. 1, 1977

[54] DIGITAL TEMPERATURE CONTROLLER

[75] Inventors: Charles Soodak, Silver Spring; Alexander Gelbman, Gaithersburg, both of Md.

[73] Assignee: Baxter Travenol Laboratories, Inc., Deerfield, Ill.

[21] Appl. No.: 598,037

[22] Filed: July 22, 1975

[51] Int. Cl.$^2$ .............................................. H05B 1/02
[52] U.S. Cl. .................................. 219/499; 219/497; 219/501
[58] Field of Search ............... 219/490, 494, 497, 499, 219/501, 506; 323/19, 225 C, 68; 340/172.5; 233/11

[56] References Cited

U.S. PATENT DOCUMENTS

| | | | |
|---|---|---|---|
| 3,474,258 | 10/1969 | Nagy | 219/497 X |
| 3,727,832 | 4/1973 | Maclin | 233/11 |
| 3,819,906 | 6/1974 | Gould | 219/506 |
| 3,856,470 | 12/1974 | Cullis et al. | 233/11 |
| Re. 28,221 | 11/1974 | Benghiat | 341/172.5 |

Primary Examiner—J. V. Truhe
Assistant Examiner—Fred E. Bell
Attorney, Agent, or Firm—Henry W. Collins; Richard G. Kinney; Herman L. Gordon

[57] ABSTRACT

A temperature control assembly for a centrifugal chemical treatment apparatus of the type having a temperature monitoring thermistor and a rotor heater. The heater is energized from a power source through a solid state relay. The thermistor is connected in a temperature Wheatstone bridge which delivers a voltage signal to a digital voltmeter. The digital voltmeter generates a binary output which is compared in a computer with a digital command signal from a keyboard unit. The binary computer output is a programmed function of the difference between the keyboard digital temperature command signal and the voltmeter output. This computer output controls a variable duty cycle multivibrator stage which provides a relay-operating signal whose "on" time is in accordance with the difference between the keyboard command temperature and the digital voltmeter output signal. This operating signal is delivered to the relay via an over-temperature and failure detector receiving signals from the digital voltmeter. The relay is held open if forbidden signals are received, such as signals of incorrect polarity, over-range signals, signals resulting from a meter defect, signals resulting from a shorted or open thermistor, or the like. The same reference voltage is used for the digital voltmeter and the temperature Wheatstone bridge so that changes in reference voltage do not affect the voltmeter readings. The bridge is designed so that the bridge output in volts is equal to 1/100 of the temperature in degrees Centigrade to facilitate display, over the specified design temperature range. The voltmeter is of a type providing forbidden signal outputs, including over-range, wrong polarity, overload, etc.

6 Claims, 6 Drawing Figures

DIGITAL TEMPERATURE CONTROLLER

This invention relates to temperature control systems, and more particularly to a temperature control assembly for a centrifugal chemical treatment apparatus of the type having a temperature-sensitive monitoring element and a rotor heater.

A main object of the invention is to provide a novel and improved temperature control apparatus for a centrifugal chemical treatment assembly, the apparatus being of the digital type and being arranged to maintain the treatment device very close to a digitally specified desired temperature, the apparatus involving relatively easily available components, and being stable and reliable in operation.

A further object of the invention is to provide an improved digital temperature control assembly for a chemical treatment apparatus of the type employing a temperature monitoring electrical sensing element connected in a Wheatstone bridge and furnishing a temperature signal to a digital voltmeter and including means to maintain the apparatus at a specified digital temperature by energizing a heater for periods which depend on the difference between the specified temperature and the detected temperature, the assembly being arranged to withold energization of the heater if the detected temperature is above the specified temperature, if the digital voltmeter is defective, or it the sensing element is open or shorted.

A still further object of the invention is to provide an improved digital temperature control assembly for a chemical treatment apparatus wherein the treatment apparatus is held close to a specified digital temperature inserted into the system by a keyboard and which employs a heater to raise the temperature of the treatment apparatus, with a duty cycle in accordance with the difference between the specified temperature and the actual detected temperature of the treatment apparatus.

A still further object of the invention is to provide an improved digital temperature control assembly for a chemical treatment apparatus, the assembly providing digital readout of the actual temperature of the treatment apparatus and self-adjustment to a specified desired digital temperature inserted into the assembly by a keyboard, and including means to withold adjustment when portions of the assembly become defective or when the temperature of the treatment apparatus is above its working temperature range, the assembly utilizing a computer to generate a duty cycle-adjusting signal in accordance with the difference between the inserted desired temperature and the actual digital temperature of the treatment apparatus, and the duty cycle-adjusting signal being employed to energize a heater in the treatment apparatus, the assembly using relatively simple components, rapidly sensing abnormalities in operation, and responding rapidly thereto to withold energization of the heater.

Further objects and advantages of the invention will become apparent from the following description and claims, and from the accompanying drawings, wherein:

FIG. 5 is a diagram showing a portion of the terminal strip of the digital voltmeter in association with its digital indicator panel and showing the connections to other parts of the system of FIG. 1.

An important feature of the present invention is the concept of utilizing an appropriately programmed computer function determined by specific test conditions (including physical and chemical properties of reagents and samples involved in an analysis) in a centrifugal chemical treatment apparatus, to regulate the speed at which the desired temperature is established in the test area when the actual measured temperature is different therefrom, so as to avoid overshoot of temperature or interfering effects caused by too rapid exposure of reagents or samples to heat input, and to avoid excessive temperature cycling of the centrifuged reagents and samples; the present invention aims to attain the desired temperature at a rate which is a suitably programmed function of the difference between the desired temperature and the actual measured temperature in the test area, the function being programmable in accordance with the expected physical factors, as well as with the physical and chemical properites of the reagents and samples involved.

Figure 1:
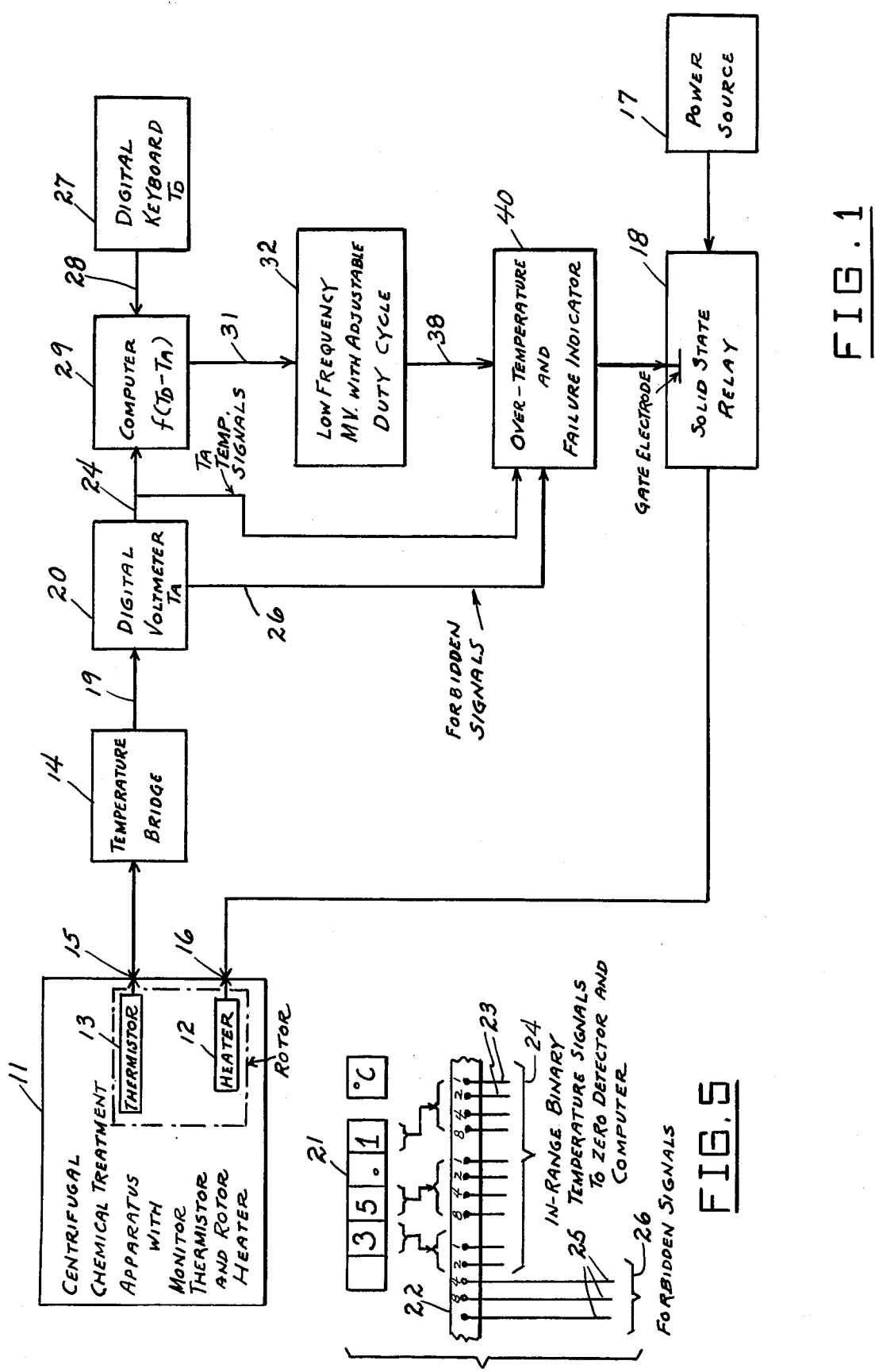
FIG. 1 is a block diagram of a temperature control system according to the present invention.

Referring to the drawings, 11 schematically designates a centrifugal chemical treatment apparatus of a type similar to the Rotochem, manufactured by American Instrument Co., Inc., Silver Spring, Maryland and which is generally similar to the apparatus shown and described in U.S.Pat. No. 3,856,470,to Herbert M. Gullis et al. This apparatus employs a rotating carrier in which chemical reactions are performed and studied optically, the reactions taking place at specific temperatures and the analyses being performed at specific wavelengths. Thus, it is highly important to provide accurate and reliable means to control the temperature of the rotating reaction vessel. For this purpose, a heater is provided on the rotary member, shown schematically at 12 in FIG. 1, and a temperature sensing element, such as thermistor 13, is employed to sense the temperature. Suitable rotational connection means, such as cooperating contact brushes and slip rings are provided to connect elements 12 and 13 to their associated external circuitry.

The thermistor 13 is connected through its brush-and-slip ring connection means 15 so as to constitute an arm of a temperature Wheatstone bridge 14. The temperature-correcting heater 12 is connected through its brush-and-slip ring connection means 16 as in the above-mentioned U. S. Pat. No. 3,856,470, to a suitable current supply source 17 through a solid state relay 18, energized to render it conducting in a manner presently to be described.

The output of the bridge 14 is connected at 19 to the input of a conventional digital voltmeter 20, similar to Model AD2006, manufactured by Analog Devices, Route 1 Industrial Park, Norwood, Mass. This digital voltmeter has a digital readout panel 22 (see FIG. 5) providing a digital readout of actual rotor temperature $T_A$, and has a terminal strip 22 providing access to the binary data producing this readout, as well as other operating data which may be generated, such as incorrect signal polarity at the digital voltmeter input, over-range data, overload, or other abnormal condition-indicating data.

The temperature in the chemical treatment apparatus must be held at a temperature in a range having a definite upper limit, for example, 40° C. The in-range binary temperature data is available at the terminal strip 22 by connections to suitable corresponding terminals thereof by wires 23 shown in FIG. 5, forming an output channel 24. The abnormal-condition data ("forbidden signals") is available at the terminal strip 22 by connections to corresponding terminals thereof by wires 25, forming an output channel 26. The in-range desired digital temperature $T_D$ is selected by means of a keyboard-operated device 27, and the binary signals corresponding to this desired digital temperature $T_D$ are carried by wires forming an output channel 28, shown in FIG. 1.

The $T_A$ (actual temperature) binary signal data in the channel 24 and the $T_D$ (desired temperature) binary signal data in the channel 28 are furnished to a computer 29 programmed to derive therefrom binary data defining a suitable digital heater duty cycle-controlling function $f(T_D\text{-}T_A)$ in accordance with the difference between the desired temperature $T_D$ and the actual measured temperature $T_A$, and this binary data is supplied at the output of computer 29 by wires 30 (see FIG. 3) forming the computer output channel 31.

Figure 3:
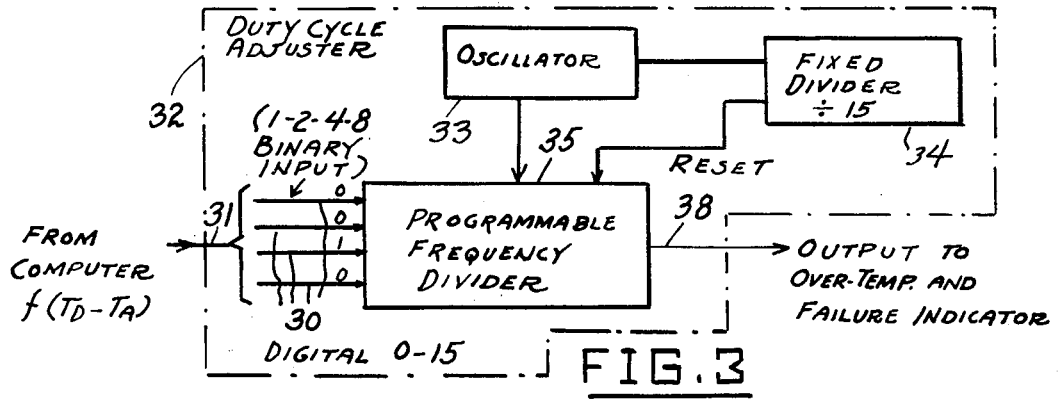
FIG. 3 is a schematic block diagram of the duty cycle-adjusting stage of the system FIG. 1.
Figure 4:
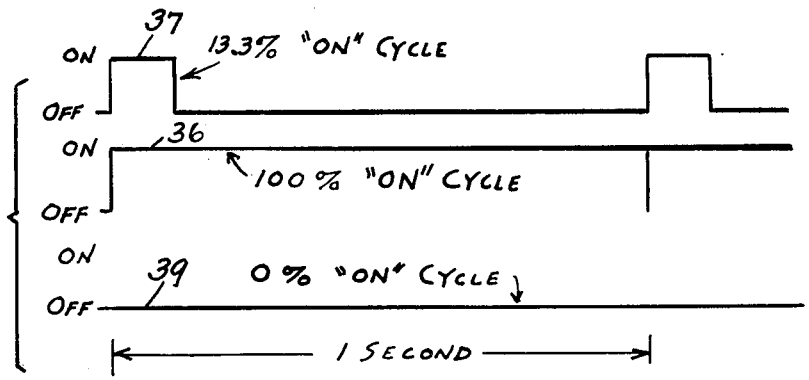
FIG. 4 illustrates graphs showing various typical heater duty cycle control signals which may be obtained from the duty cycle adjustment stage of FIG. 3.
Figure 6:
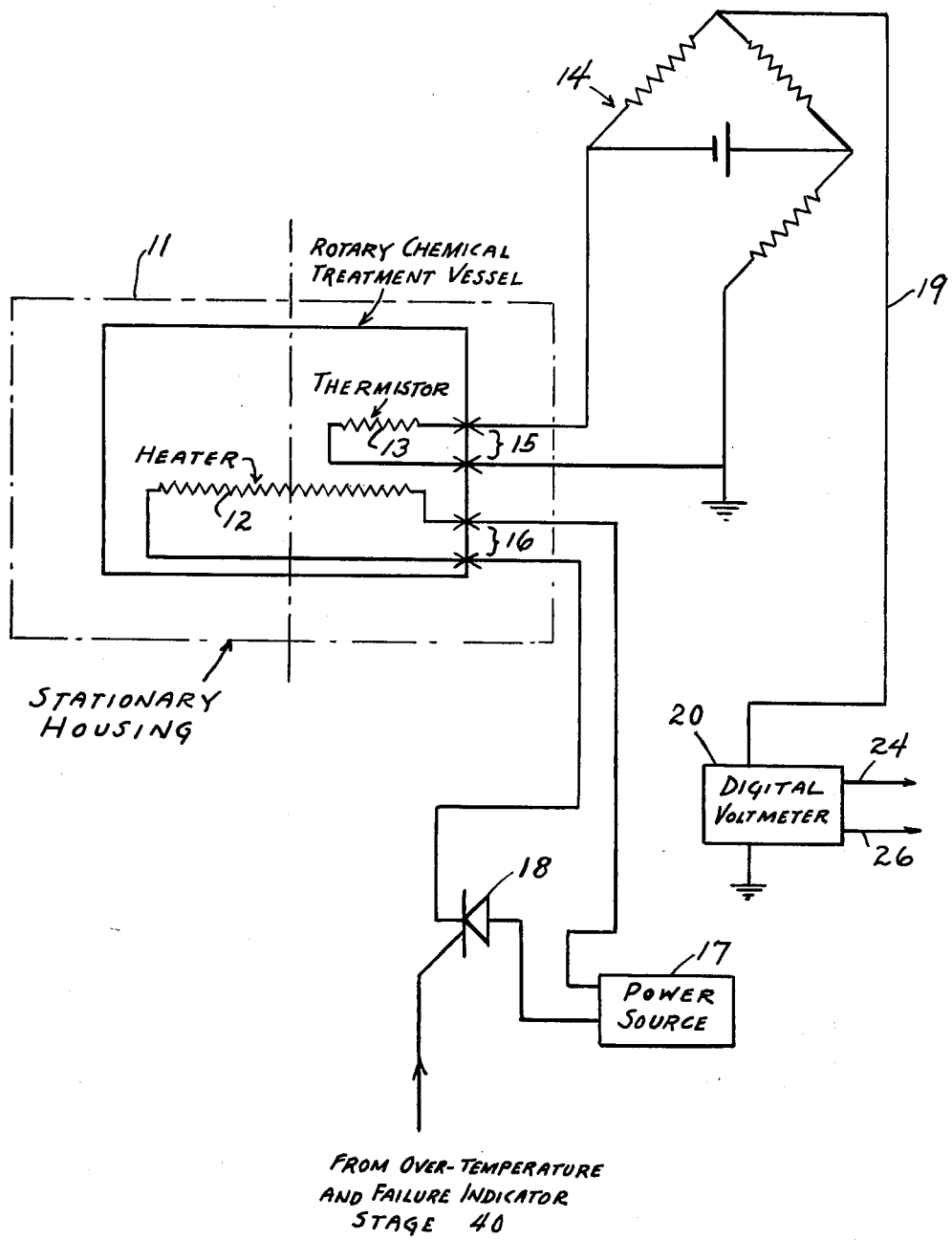
FIG. 6 is a schematic partial wiring diagram of the system of FIG. 1, showing the Wheatstone bridge and heater connections schematically relative to the chemical treatment vessel and rotor of the chemical treatment apparatus.

The computer output function $f(T_D\text{-}T_A)$ is furnished in binary form to a duty cycle adjuster 32, shown in FIG. 3. The adjuster 32 comprises a conventional low frequency multivibrator circuit including a driving oscillator 33 cooperating with a fixed divider 34 and a binary signal-controlled programmable frequency divider section 35 which forms an output pulse 37 having a width which is a digital multiple of fractional segments of a basic pulse 36 (see FIG. 4). The fixed divider 34 determines the frequency division denominator and also provides reset action for each pulse cycle. In the present case the denominator is 15 (maximum binary count 8+4+2+1), and the programmable divider section 35 selects the pulse segment multiple in accordance with the binary input function $f(T_D\text{-}T_A)$. For example, assuming that $f(T_D\text{-}T_A)$ represents digit "2" (a binary signal 0010 furnished by input wires 30), the divider output pulse at 38 will have a width of 2/15 of the basic pulse 36, or 13.3% thereof. This provides a control pulse at 38 representing a duty cycle of 13.3%. The duty cycle pulse widths will therefore be digital multiples of 1/15 of the basic pulse width 36 in accordance with different digital values of the function $f(T_D\text{-}T_A)$. At equivalence of $T_D$ and $T_A$, $f(T_D\text{-}T_A)$ will be zero, giving a zero duty cycle, as shown at 39 in FIG. 4.

The duty cycle pulse at 38 is employed to turn on the solid state relay 18 for an "on" time per cycle in accordance with $f(T_D\text{-}T_A)$. Said duty cycle pulse is furnished to the gate electrode of relay 18 via the over-temperature and failure indicator stage 40, shown in detail in FIG. 2.

Figure 2:
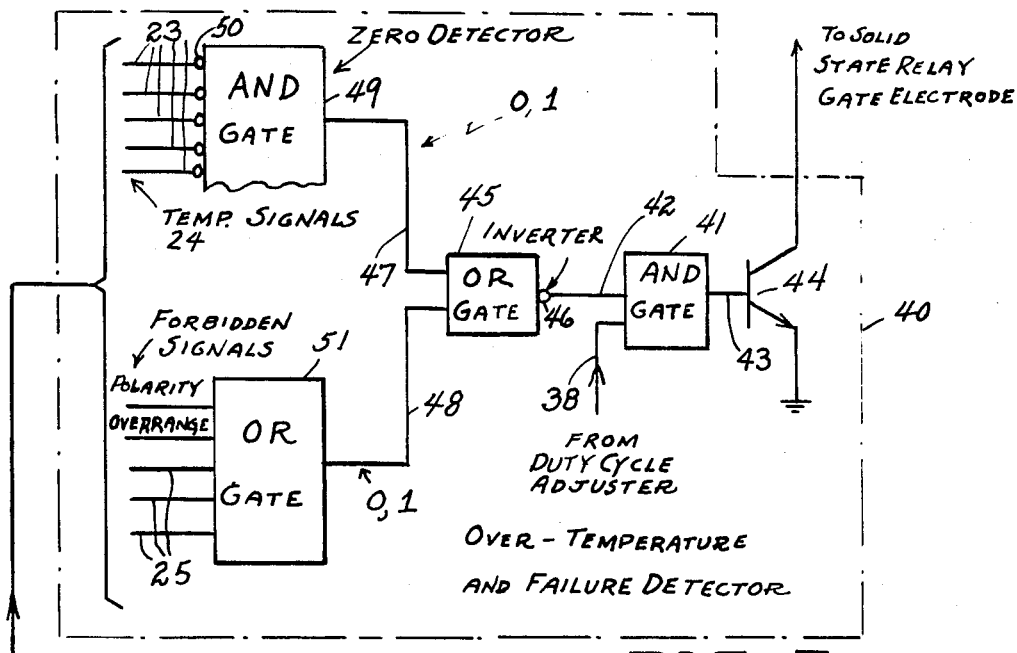
FIG. 2 is a schematic block diagram of the over-temperature and failure detection stage of the system of FIG. 1.

As shown in FIG. 2, the duty cycle signal is applied by line 38 to one input of a 2-input AND gate 41. When the AND gate 41 receives a "1" signal at its other input, shown at 42, the gate conducts during the duty cycle "on" period. The output of the gate 41 is connected at 43 to the base of a switching transistor 44 connected between line 43 and the gate electrode of the solid state relay 18. Relay 18 is therefore turned on during the duty cycle "on" period, energizing the heater 12 during this period.

The "1" signal at 42 is formed from the "0" output of a two-input OR gate 45 via an inverter 46. The OR gate 45 has the two input lines 47 and 48. The line 47 is the output line of a multi-input AND gate 49. The $T_A$ temperature binary data wires 23 are connected to the respective inputs of the AND gate 49 through inverters 50. When normal binary temperature data signals (including at least one "1" signal) are being furnished by wires 23 to AND gate 49, the gate will furnish an enabling "0" signal to the line 47. When there is a failure of the input binary temperature data signals, namely, when they are all "0", the gate will furnish an inhibit "1" signal to the line 47. An inhibit "1" signal at 47 will produce an inhibit "0" signal at line 42, and transistor 44 will not be turned on.

The "forbidden" signals (wrong polarity, over-range, etc.), if present, are applied to the inputs of a multi-input OR gate 51 via wires 25. Thus, the presence of any "1" forbidden signal at the input wires 23 will produce an inhibit "1" signal at the gate output line 48. This will produce an inhibit "0" at the AND gate input 42, and will prevent transistor 44 from being turned on.

Normally, lines 47 and 48 both carry enable "0" signals, providing an enable "1" signal at line 42, allowing AND gate 41 to transmit the duty cycle control signal from line 38 to switching transistor 44. In the presence of an inhibit "1" signal in either line 47 or 48, line 42 will receive an inhibit "0" signal and will prevent the turning on of solid state relay 18.

Thus, if thermistor 13 is open or shorted, or if other abnormalities are present in the system due to other component failures or deficiencies, the binary data resulting therefrom will prevent further energization of the heater 12, thereby preventing heat damage to the system or the material being analyzed.

The digital voltmeter 20 and the temperature Wheatstone bridge 14 preferably employ the same reference voltage so that changes in reference voltage do not affect the voltmeter readings. The bridge is preferably designed so that the bridge output in volts is equal to 1/100 of the temperature in degrees Centigrade to facilitate display over the specified temperature range.

The computer 29 is of a conventional programmable type and may include suitable printer means to give a digital printout of actual temperature versus time.

The digital keyboard device 27 allows the operator to change the desired temperature $T_D$ by keyboard command. The digital readout panel 21 of the digital voltmeter gives a continuous digital display of the actual temperature $T_A$ in the reaction area, thereby allowing the operator to monitor the temperature during the chemical test. In a typical embodiment, the design range was 20° C to 40° C, with readout to 0.1° C.

The computer 29 is suitably programmed in accordance with the expected physical conditions of the test, as well as with the physical and chemical properties of the reagents and samples employed, so as to limit the duty cycle of heater 12 in a manner to avoid overshoot of temperature, interfering effects caused by too rapid exposure of reagents or samples to heat input, or excessive temperature cycling of the ingredients involved in the tests. Since the program of computer 29 can be readily changed, the apparatus can be successfully employed for tests of materials having a very wide range of physical and chemical properties.

While a specific embodiment of an improved temperature control assembly for a centrifugal chemical treatment apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A chemical treatment apparatus including temperature control means comprising heater means, an electrical power source, circuit means including a relay device connecting said power source to said heater means, temperature sensing means including a temperature sensor in the apparatus generating a signal corresponding to actual temperature, temperature command means furnishing a command signal corresponding to a desired temperature, programmable computer means connected between the sensing means and the command means generating a control signal which is a programmed function of the difference between the desired temperature and the actual temperature, means operating said relay device in accordance with said control signal to control the supply of power to said heater means and modulate the supply in accordance with said programmed function, temperature indicating means connected to said sensing means, said indicating means having means to provide an output signal corresponding to said actual temperature, wherein said computer means is connected between the output of said indicating means and said command means, wherein said temperature indicating means comprises a digital voltmeter and said output signal is in binary form, the command signal being likewise in binary form, and wherein said digital voltmeter includes terminal means to supply the binary actual temperature output signals and means to supply additional signals representing abnormal system conditions, and means to inhibit operation of said relay device responsive to the presence of any of said additional signals or to the absence of actual temperature output signals.

2. The chemical treatment apparatus of claim 1, and means to inhibit operation of said relay device responsive to an actual temperature signal corresponding to a value above a predetermined limit.

3. The chemical treatment apparatus of claim 1, and wherein said inhibiting means comprises a first OR gate receiving said additional signals, a first AND gate including respective inverters at its inputs receiving said binary actual temperature signals, a second OR gate receiving the outputs of said first OR gate and said first AND gate, said second OR gate being provided with an inverter at its output, duty cycle adjusting means receiving the output of said computer means, a second AND gate receiving the inverted output of said second OR gate and the output of said duty cycle adjusting means, and circuit means operatively connecting the output of said second AND gate to said relay device.

4. The chemical treatment apparatus of claim 3, and wherein said relay device comprises a solid state relay and wherein said last-named circuit means comprises a switching transistor connected between the output of said second AND gate and the gate electrode of said solid state relay.

5. The chemical treatment apparatus of claim 3, and wherein said chemical treatment apparatus is of the centrifuge type having a rotor comprising a treatment vessel and wherein the heater means and the temperature sensor are mounted on the rotor.

6. The chemical treatment apparatus of claim 5, and wherein said temperature sensor comprises a thermistor and the temperature sensing means comprises a Wheatstone bridge with the thermistor forming an arm of the bridge.

* * * * *